Figure 1:
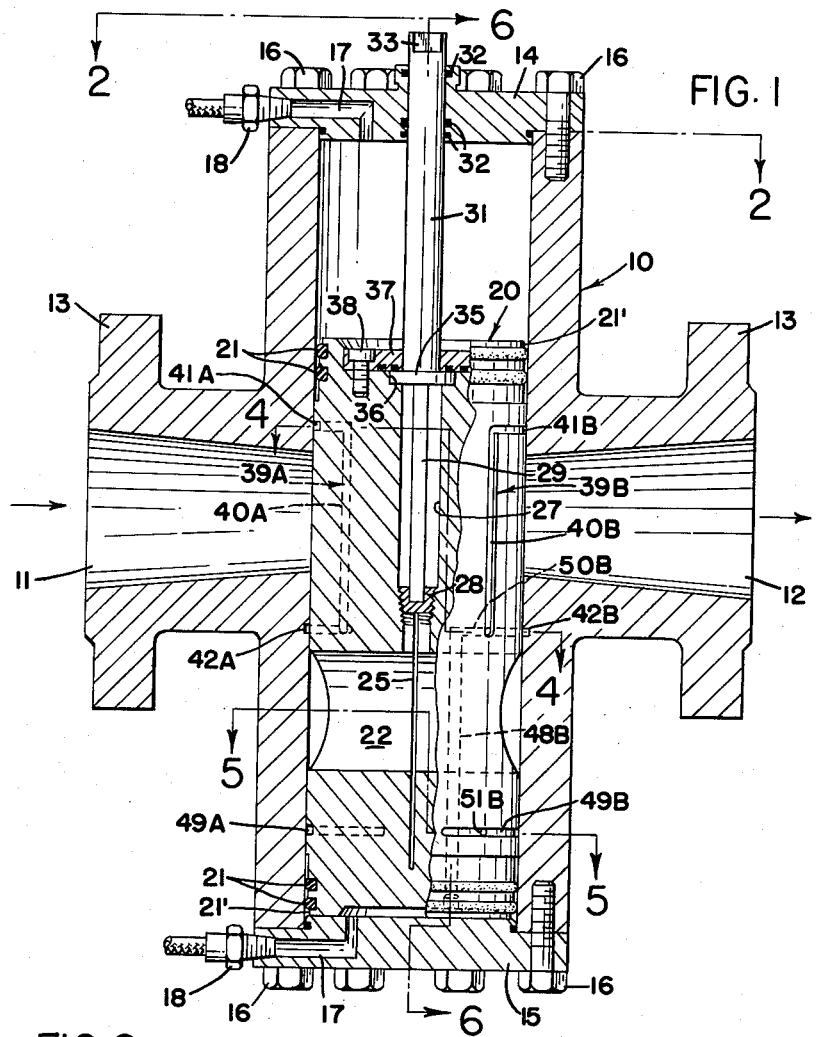

Oct. 17, 1961  H. J. SHAFER  3,004,551
SEALING CONSTRUCTION FOR PISTON VALVE
Filed Nov. 28, 1958  3 Sheets-Sheet 1

INVENTOR.
HOMER J. SHAFER
BY
ATTORNEYS

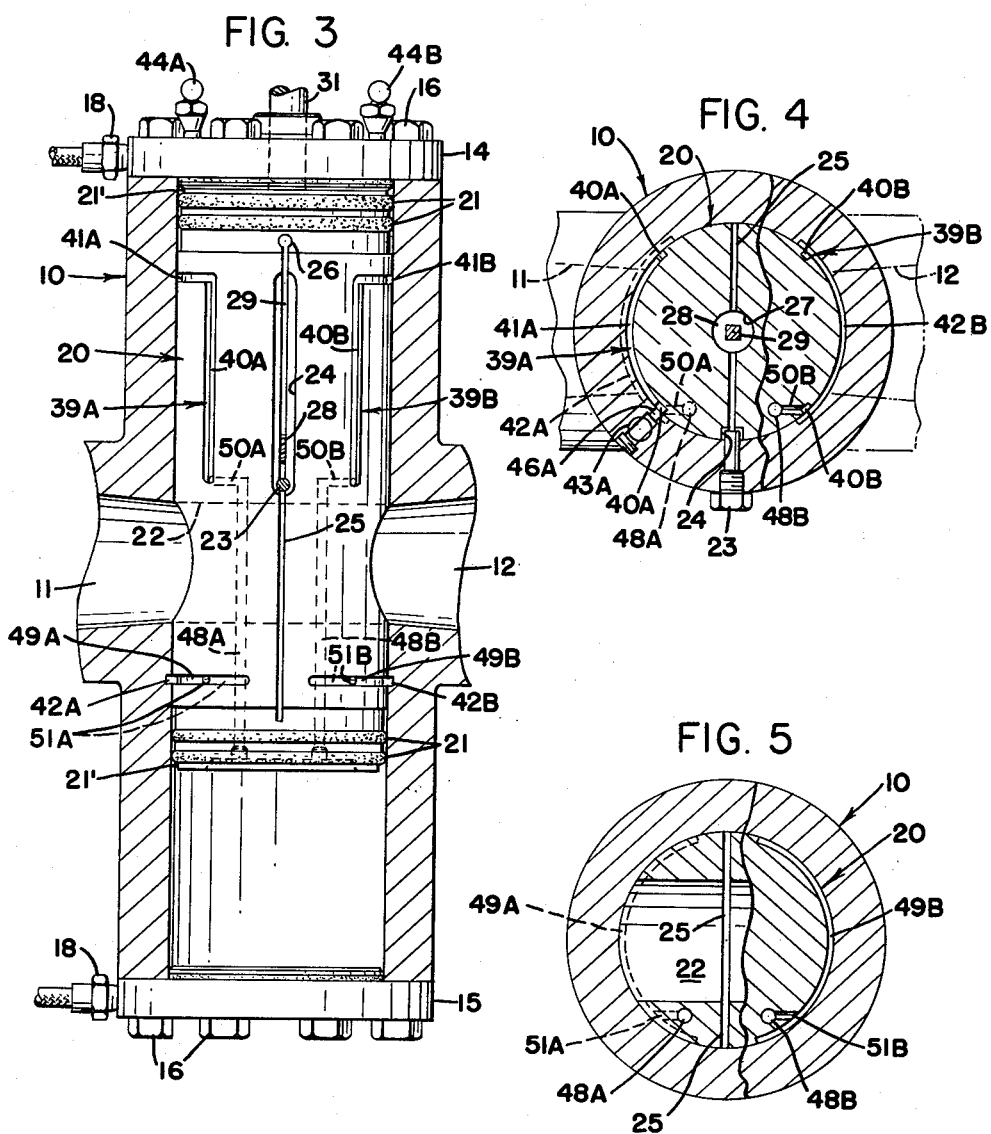

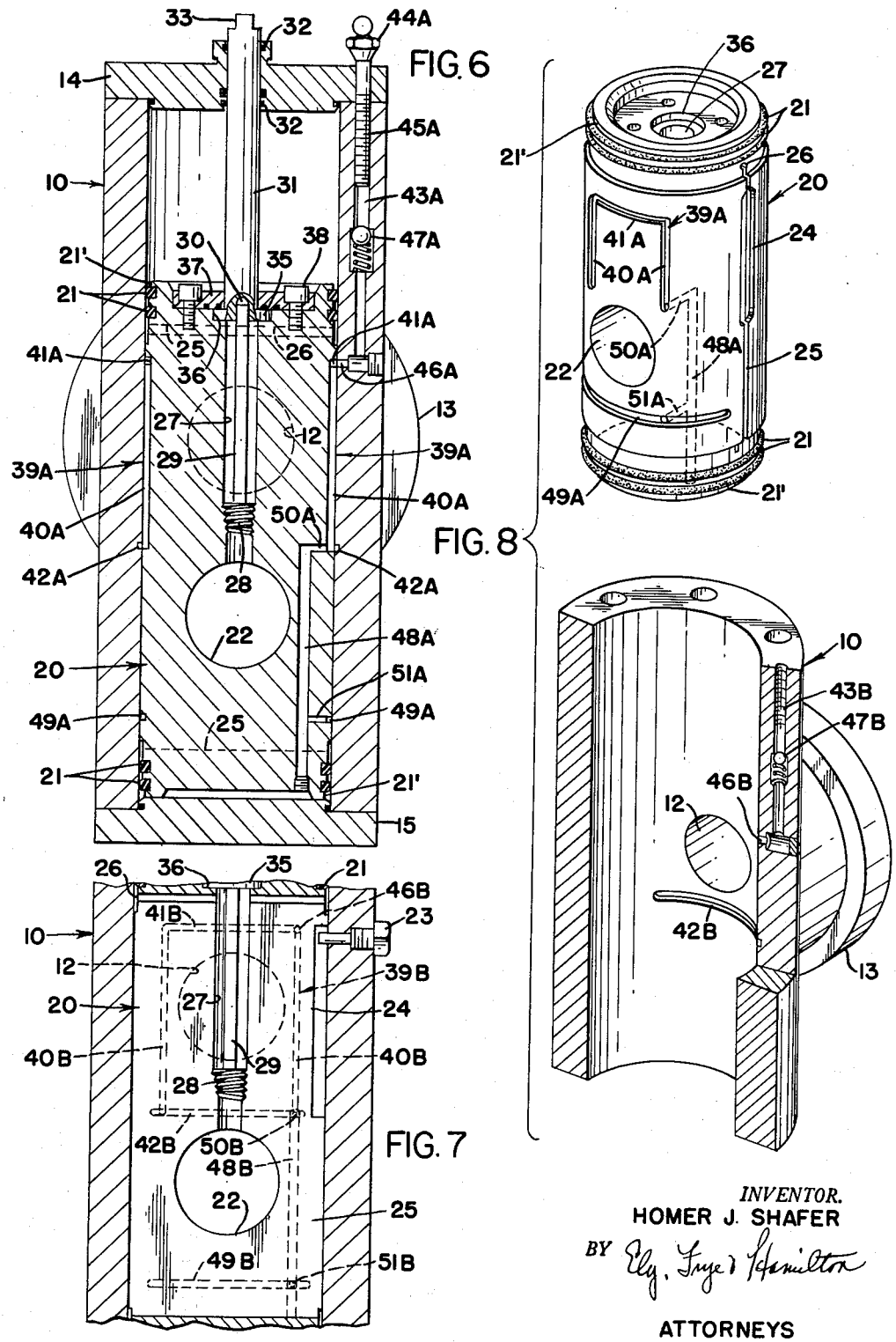

United States Patent Office 3,004,551
Patented Oct. 17, 1961

3,004,551
SEALING CONSTRUCTION FOR PISTON VALVE
Homer J. Shafer, P.O. Box 83, Mansfield, Ohio
Filed Nov. 28, 1958, Ser. No. 776,860
3 Claims. (Cl. 137—246.16)

The invention relates to piston type valves for pipe lines carrying high pressures, and more particularly to an improved arrangement of lubricant groove seals and O-ring seals for a piston type valve.

In certain prior piston valves lubricant grooves were provided in the piston surrounding the valve port in the body in the closed position of the valve, and in some cases the lubricant grooves in the piston also surrounded the valve port in the piston. Such grooves were not adequate to provide a satisfactory seal, and piston rings were also provided around either end of the piston.

In the closed position of such valves under high pressures, enough leakage still occurred past both the lubricant seals and piston rings to move the piston and start to open the valve. Moreover, that part of the lubricant grooves which passed across the body ports when the valve was opened and closed was subjected to the high line pressures tending to blow the lubricant out of the grooves.

It has been proposed to replace the piston rings on the ends of the piston with resilient O-rings, but in assembling the piston and rings within the body, the rings at one end of the piston are often scored or damaged by being forced past the body port, due to the close required tolerance between the piston and body. Attempts to relieve the sharpness of the corners around the body port either produced burrs in the adjacent surfaces or reduced the effective sealing distance between the body port and the lubricant seal due to the close tolerance between the piston and body.

Further, that area of the body between the body port and the piston port in closed position is subjected to wear or scouring by the pipe line fluid as the piston port passes over that wear area during opening and closing, the greatest wear being on the outlet or downstream side of the body.

It is an object of the present invention to provide an improved piston valve construction having a novel arrangement of lubricant groove seals and O-ring seals which overcomes the foregoing disadvantages of prior constructions.

More specifically, it is an object to provide a lubricant sealing groove construction, partly in the body and partly in the piston, in which no part of the grooves passes over the ports in the body or the piston as the piston valve is opened and closed.

A further object is to provide a lubricant sealing groove construction in which lubricant may be supplied only to the high pressure differential side of the valve in closed position.

Another object is to provide a combination lubricant and O-ring seal construction in which the piston and O-rings can be assembled without passing the O-rings over the body port, and in which the O-rings do not pass over the wear area of the body in the operation of the valve.

A still further object is to provide an improved piston valve in which the piston has compensating means to relieve lateral pressure on the piston due to distortion of the body resulting from expansion or contraction of the pipe line in which the valve is located, which permits closer tolerance between the piston and body.

These and other objects apparent from the following description are accomplished by the improvements comprising the present invention, a preferred embodiment of which is shown by way of example in the accompanying drawings and described in detail in the following specification as representing the best known mode of carrying out the invention. Various modifications and changes in details of construction are comprehended within the scope of the invention defined in the appended claims.

Figure 2:
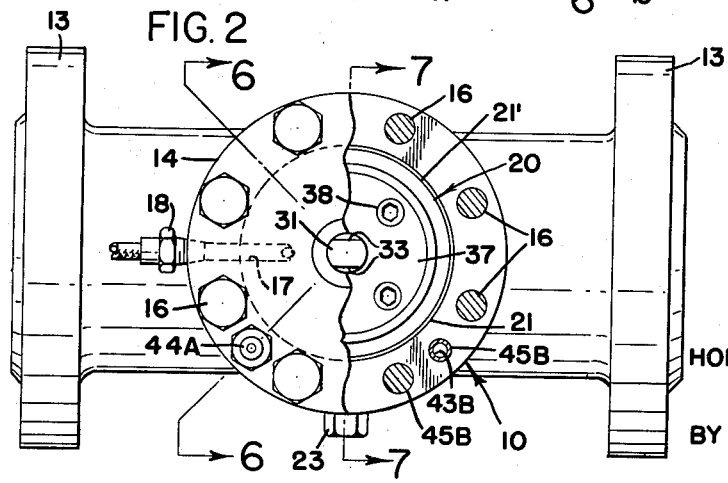

In the drawings:
FIG. 1 is a vertical sectional view of the improved piston valve in closed position, the piston being shown partly in elevation.
FIG. 2 is a plan view taken as on line 2—2 of FIG. 1.
FIG. 3 is a vertical sectional view similar to FIG. 1, with the piston in open position and shown in elevation.
FIG. 4 is a plan sectional view on line 4—4 of FIG. 1.
FIG. 5 is a plan sectional view on line 5—5 of FIG. 1.
FIG. 6 is a vertical sectional view as on line 6—6 of FIGS. 1 and 2.
FIG. 7 is a partial vertical sectional view on line 7—7 of FIG. 2.
FIG. 8 is an exploded perspective view of the piston and cylindrical body, the body being shown in section with the top and bottom walls removed.

The housing or body of the improved piston valve is indicated generally at 10 and is cylindrical in form having opposed registering fluid ports, 11 being designated the inlet port and 12 the outlet port. As shown in FIGS. 6–8, the ports 11 and 12 are outwardly diverging and have the same inner diameter at their outer ends as the pipe line in which the valve is connected. While the ports 11 and 12 are circular, their inner ends may be squared if a square flow passage in the piston is provided. The walls forming the ports 11 and 12 preferably have flanges 13 at their outer ends to make the usual flanged connections with the pipe line.

The body 10 has removable end plates 14 and 15 secured thereto by screw studs 16, and each end plate has an L-shaped port 17 fitted with a fluid pressure connection 18 for supplying and exhausting fluid pressure alternately to opposite ends of the body to reciprocate the piston therein to open and closed positions.

The piston which is reciprocable in the body 10 is indicated generally at 20, and is provided at each end with a pair of O-rings 21, the outer ring of each pair functioning as a wiper ring with a reduced diameter 21' on the piston axially outward of the ring, and the inner ring as a sealing ring. The reduced diameter 21' relieves pressure build-up between the rings, thus prolonging the life of the inner ring. The piston is provided between its ends with a through port 22 of the same size as the ports 11 and 12 in the body, and adapted to register with the said ports when the piston is in full open position, as in FIG. 3. As shown the port 22 is substantially nearer to the bottom end of the piston than to the top, for a purpose to be described.

Means is provided for preventing axial rotation of the piston 20 as it reciprocates, and preferably comprises a screw stud 23 extending through the body 10, preferably at 90° to the ports 11 and 12, and slidably received in a vertical groove 24 in the exterior of the piston wall (FIG. 7), to allow vertical movement of the piston from fully open to fully closed position.

A vertical slot 25 is provided extending transversely entirely through the piston 20 at 90° to the port 22 therein, so that the groove 24 coincides with the slot 25 for a portion of the length of the slot. Preferably, the slot 25 extends vertically from points axially adjacent to the inner sealing rings 21, and may be formed by drilling a hole 26 at one end and making a saw cut from there to the other end.

One purpose of the slot 25 is to compensate for or relieve lateral pressure on the piston due to distortion of the body resulting from expansion or contraction of the pipe line in which the piston valve is connected. This permits closer tolerances between the piston and body to obtain a tighter fluid seal therebetween in closed position.

As best shown in FIGS. 1, 6 and 7, the piston 20 has a circular bore 27 extending axially therein from the top to the flow port 22, a tapered thread receiving a tapered screw plug 28 being provided adjacent to the port 22. The plug 28 has a squared rod 29 secured therein extending upwardly through the bore 27 and fitting slidably in a squared socket 30 (FIG. 6) in the lower end of a shaft 31 extending upwardly through the top plate 14 of the cylinder with suitable O-ring seals 32 around the shaft. The upper projecting end of the shaft is provided with wrench lands 33 for turning the shaft with a wrench. The amount projecting of this shaft 31 is a visual indicator of the position of the piston valve (FIG. 3).

The lower end of shaft 31 is preferably provided with an annular collar 35 seated within a shouldered portion 36 at the upper end of bore 27, and held therein by a plate 37 secured by screws 38 in a circular recess in the top of piston 20. Hence, by rotating the shaft 31 the tapered screw may be screwed downwardly to exert a wedging action on the two halves of the piston formed by the slot 25, so that when the piston is in the closed position of FIG. 1, the working clearance between the piston and cylinder may be decreased to insure a tighter seal. This working tolerance should be about .001″ to .002″ when the piston is moved during opening or closing, and such tolerance normally allows some seepage under high pressures. By providing for wedging the halves of the piston apart in closed position, the normal working tolerance can be slightly decreased to provide a tight seal in closed position, and slightly increased to insure free movement of the piston between open and closed positions.

The height of the piston 20 is proportioned to the height of the body 10 between the port openings 11 and 12 and the bottom of the cylinder, so that the O-rings 21 can be applied to the ends of the piston without passing the O-rings across the ports, and so that the O-rings never pass over the wear area of the cylinder. Referring to FIG. 1, the wear area is that portion of the inner surface of the outlet side of the cylinder extending between outlet port 12 and the outlet end of piston port 22 in the closed position of the piston. The port 22 is located so that in closed position the height of the wear area between the piston port 22 and the body port 12, or in other words the overlap of the piston, is substantial in order to increase the effectiveness of the seal between the piston and the cylinder around the body port 12.

As the piston is moved between open and closed positions, this wear area is subjected to the wearing action of the pressure fluid passing through the partly opened port 22 and striking the cylinder at the outlet end of the port, and the wear area becomes scored or abraded. Hence, if the O-rings were removed across this surface they would become damaged to the extent of detracting from the effectiveness of their seal.

Referring to FIGS. 1 and 3, when the piston valve is assembled, the top and bottom plates 14 and 15 are removed and the piston 20 inserted into the top of the cylinder with the upper O-rings 21 applied and the lower rings removed. The piston is then pushed downwardly to project its lower end sufficiently to apply the lower rings thereto, which may be done without passing the uper rings over the ports 11 and 12 due to the height of the piston above the ports in the closed position of FIG. 1. After the piston is raised to pass the lower end within the cylinder, the shaft 31 may be connected to the upper end of the cylinder, and then the upper and lower plates 14 and 15 applied.

By comparing FIGS. 1 and 3, it will be seen that because of the distance between the bottom of the piston and its port 22, the lower O-rings 21 never pass over the wear area of the cylinder in moving between closed and open positions.

The arrangement of lubricant sealing grooves comprises duplicate sets of grooves on the inlet and outlet sides of the piston and cylinder, with a separate source of lubricant for each set, so that lubricant can be supplied selectively to one side or the other. Referring to FIGS. 3 and 8, the piston 20 is provided with an inverted U-shaped groove indicated generally at 39A above the inlet end of port 22, having vertical leg portions 40A connected at their upper ends by a horizontal cross groove 41A. An identical groove 39B is provided diametrically opposite groove 39A above the outlet end of port 22, having vertical leg portions 40B connected at their upper ends by a horizontal cross groove 41B. When the piston 20 is in closed position, these U-shaped grooves 39A and 39B straddle the body ports 11 and 12, respectively, as shown in FIGS. 1 and 7, with the cross grooves 41A and 41B above the ports.

To complete a lubricant sealing groove completely surrounding the ports 11 and 12 in the closed position of the piston, horizontal cross goroves 42A and 42B are provided in the inner surface of the cylinder 10, in such position as to connect the bottom ends of the legs 40A and 40B. By locating the cross grooves 42A and 42B in the cylinder, instead of in the piston, no part of the lubricant groove is required to pass over the body ports 11 and 12 during opening and closing movement, so that the lubricant in the grooves is not blown out by the pressure fluid passing through the valve.

Lubricant supply ducts 43A and 43B are provided for the grooves 39A and 39B, respectively, the ducts extending vertically through the cylindrical wall of body 10 and preferably through the upper plate 14, and being fitted with suitable lubricant fittings 44A and 44B through which lubricant can be introduced from time to time. The fittings 44A and 44B preferably have tubular feed screws 45A and 45B threaded into the ducts 43A and 43B, for forcing lubricant in the ducts into the lubricant grooves 39A and 39B.

The bottom ends of ducts 43A and 43B connect with radial ports 46A and 46B extending through the cylinder wall and registering with one of the vertical legs 40A and 40B, respectively. These ports 46A and 46B are located so as to connect with the tops of legs 40A and 40B when the piston is in closed position (FIG. 6), and with the bottoms of the same legs when the piston is in open position. Check valves 47A and 47B of well known construction are located in the ducts 43A and 43B.

When the piston 20 is in the closed position of FIGS. 1, 6 and 7, the fluid pressure in the inlet or upstream port 11 forces the piston against the inner end of outlet port 12, and the feed screw 45B is given a turn or two to force lubricant through the duct 43B and into the lubricant groove 39B and thence into cross groove 43B, to form a lubricant seal completely surrounding the port 12. In order to insure a completely tight seal, the shaft 31 may be turned with a wrench to screw in the tapered plug 28 and wedge apart the two parts of the piston. The substantial height of the wear area between piston port 22 and body port 12 aids in maintaining a tight seal.

When the piston is raised to open position by introducing pressure fluid into the bottom fitting 18, the port 22 begins to cross over body ports 11 and 12, the line pressure fluid will blow the lubricant out of the cross grooves 42A and 42B in the body, and the groove 42B is refilled in the manner just described when the piston is reclosed. The lubricant in groove 39B is maintained by the feed from conduit 43B and lubricates the piston as it rises. A slight amount of lubricant may be fed into the groove 39A from time to time for lubrication purposes, but the main function of the lubricant feed from conduit 43A is to supply lubricant to the grooves 39A and 42A when flow through the valve is reversed and port 11 becomes the outlet or downstream port. The particular arrangement and location of the lubricant grooves 39A and 39B and supply ports 46A and 46B allows feeding lubricant to the grooves 39A and 39B in any position of the piston 20 without losing any lubricant pressure in grooves 39A and 39B.

In order to lubricate the piston below its port 22 at all times, lubricant conduits 48A and 48B may be provided internally of the piston 20 to conduct lubricant from the grooves 39A and 39B, respectively, to cross grooves 49A and 49B formed in the piston below the opposite ends of port 22. The conduit 48A is connected at its upper end by a port 50A to the lower end of one of the grooves 40A, and is connected by a port 51A to the cross groove 49A. Similarly, the conduit 48B is connected at its upper end by a port 50B to the lower end of one of the grooves 40B, and is connected by a port 51B to the cross groove 49B. As shown in FIG. 3, in fully open position, the cross grooves 49A and 49B register with the body cross grooves 42A and 42B, respectively, so that as the piston moves between open and closed positions the grooves 49A and 49B lubricate the cylinder from the cross grooves 42A and 42B downwardly to the position of the cross grooves 49A and 49B in the closed position of FIG. 1.

It will be apparent from the foregoing description that an improved piston valve is provided having lubricant seals surrounding the flow ports of the valve body in the closed position of the piston, and having O-ring seals on both ends of the piston which never pass over body ports or lubricant grooves during assembly or operation. Moreover, the piston is split to compensate for distortion of the body due to expansion and contraction in the pipe line in which it is connected, and to allow wedging apart of the piston halves to enhance the tightness of the seal in closed position around the outlet port in the body. Further, the relative dimensions of the piston and body provide for a substantial wear area in the body between its outlet port and the piston port in closed position, and this area is not traversed by the O-rings on the piston.

What is claimed is:

1. In a piston valve having a body provided with aligned inlet and outlet ports and a piston having a through port registrable with said inlet and outlet ports when the piston is moved from closed to open position, said piston having resilient sealing rings around its ends and longitudinal lubricant grooves straddling said outlet port in closed position, said body having a cross lubricant groove connected to the lubricant grooves in the piston in closed position, the location of said piston port relative to said outlet port being such as to provide a substantial wear area between the piston port and outlet port in the closed position of the piston, and the longitudinal dimensions of said piston being so related to said body as to permit assembly and operation of said piston in said body without traversal by said sealing rings of said outlet ports, cross groove and wear area, and said piston being split only intermediate of and terminating short of its ends in a direction transversely of its through port to form two halves integral with the unsplit ends, to compensate for distortion of said body due to expansion and contraction.

2. In a piston valve having a body provided with aligned inlet and outlet ports and a piston having a through port registrable with said inlet and outlet ports when the piston is moved from closed to open position, said piston having resilient sealing rings around its ends and longitudinal lubricant grooves straddling said outlet port in closed position, and said piston being split only intermediate of and terminating short of its ends in a direction transversely of its through port to form two halves integral with the unsplit ends, to compensate for distortion of said body due to expansion and contraction.

3. In a piston valve having a body provided with aligned inlet and outlet ports and a piston having a through port registrable with said inlet and outlet ports when the piston is moved from closed to open position, said piston having resilient sealing rings around its ends and longitudinal lubricant grooves straddling said outlet port in closed position, said piston being split only intermediate of and terminating short of its ends in a direction transversely of its through port to form two parts integral with the unsplit ends, and means to wedge apart said two piston parts to increase the sealing contact between said piston and said body.

References Cited in the file of this patent

UNITED STATES PATENTS

| | | |
|---|---|---|
| 2,000,494 | Nordstrom | May 7, 1935 |
| 2,111,597 | Lewis | Mar. 22, 1938 |
| 2,176,594 | Nordstrom | Oct. 17, 1939 |
| 2,269,886 | Volpin | Jan. 13, 1942 |
| 2,276,929 | Church | Mar. 17, 1942 |
| 2,276,939 | Davis | Mar. 17, 1942 |
| 2,317,657 | Volpin | Apr. 27, 1943 |
| 2,406,099 | Penick | Aug. 20, 1946 |
| 2,433,638 | Volpin | Dec. 30, 1947 |
| 2,488,932 | Penick | Nov. 22, 1949 |
| 2,918,935 | Ohls | Dec. 29, 1959 |

FOREIGN PATENTS

| | | |
|---|---|---|
| 584,438 | Germany | Sept. 20, 1933 |
| 423,071 | Great Britain | Jan. 24, 1935 |